US010424764B2

(12) United States Patent
Yang (10) Patent No.: US 10,424,764 B2
(45) Date of Patent: Sep. 24, 2019

(54) FLEXIBLE PACKAGE

(71) Applicants: Prologium Technology Co., Ltd., New Taipei (TW); Prologium Holding Inc., Grand Cayman (KY)

(72) Inventor: Szu-Nan Yang, New Taipei (TW)

(73) Assignees: PROLOGIUM TECHNOLOGY CO., LTD., New Taipei (TW); PROLOGIUM HOLDING INC., Grand Cayman (KY)

( * ) Notice: Subject to any disclaimer, the term of this patent is extended or adjusted under 35 U.S.C. 154(b) by 169 days.

(21) Appl. No.: 15/450,169

(22) Filed: Mar. 6, 2017

(65) Prior Publication Data

US 2017/0256757 A1 Sep. 7, 2017

(30) Foreign Application Priority Data

Mar. 7, 2016 (TW) .............................. 105106843 A (51) Int. Cl.
*H01M 2/02* (2006.01)
*H01M 10/04* (2006.01)

(52) U.S. Cl.
CPC ......... *H01M 2/0275* (2013.01); *H01M 2/026* (2013.01); *H01M 2/0207* (2013.01); *H01M 10/0481* (2013.01); *H01M 2220/30* (2013.01)

(58) Field of Classification Search
CPC .... H01M 2/0207; H01M 2/0275; H01M 2/10; H01M 10/0468
See application file for complete search history.

(56) References Cited

U.S. PATENT DOCUMENTS

| 4,060,670 | A | * | 11/1977 | Tamminen | .......... | H01M 2/0207 |
| | | | | | | 429/154 |
| 2001/0051298 | A1 | * | 12/2001 | Hanafusa | ............ | H01M 2/0207 |
| | | | | | | 429/162 |
| 2005/0250005 | A1 | * | 11/2005 | Bacon | ................. | H01M 2/0207 |
| | | | | | | 429/152 |
| 2010/0190047 | A1 | * | 7/2010 | West | ...................... | H01M 2/08 |
| | | | | | | 429/156 |
| 2012/0270095 | A1 | * | 10/2012 | Kim | .................... | H01M 2/1077 |
| | | | | | | 429/159 |

* cited by examiner

*Primary Examiner* — Matthew J Merkling
(74) *Attorney, Agent, or Firm* — Rabin & Berdo, P.C.

(57) ABSTRACT

A flexible package has a bendability effective to at least maintain the bendability of at least one flexible battery cell accommodated therein. The flexible package includes a support module disposed in a flexible body and including a first structural member, a second structural member and at least two cushioning members that define a space for accommodating the at least one flexible battery cell when the support module is under the binding force of the flexible body. When the flexible body and the at least one flexible battery cell bend, the stress acting on the at least one flexible battery cell is reduced by the first structural member, the second structural member and the at least two cushioning members. Therefore, electrode layers inside the at least one flexible battery cell are protected and the integrity, safety, cycle life and bendability of the flexible cell are improved.

10 Claims, 7 Drawing Sheets

FLEXIBLE PACKAGE

BACKGROUND

1. Technical Field

The present invention relates to a package, particularly to a flexible package for battery cell.

2. Description of Related Art

Portable electronic products are used in various industries, such as health, entertainment and so on. Portable electronic products in these industries are required to be lightweight, portable and versatile. Since some factors like the size and the shape of these products are being considered, the flexible batteries play an important role in these portable electronic products.

If the flexible cell is accommodated in a conventional hard shell packaging, the overall flexibility of the flexible cell will be limited and reduced. To avoid this, it is reasonable to replace the traditional package with flexible package.

However, bending the flexible cell packed in a flexible package would cause the flexible cell peeling off or separating, so that the integrity, safety, service life and bendability of the battery cell may be degraded.

To overcome the abovementioned problems, the present invention provides a flexible package, so as to solve the afore-mentioned problems of the prior art.

SUMMARY OF THE INVENTION

A primary objective of the present invention is to provide a flexible package, which the binding force to the flexible body provided by the fixed part can be reduced by the structure and the positional arrangement of the cushioning member. The flexible cell can be disposed in a placing space formed by the first structural member, the second structural member and the cushioning member. During bending the flexible battery, the structural protection and twist restrictions of the support module can effectively reduce the possibility of defects such as peeling off or separating of the flexible cell. Therefore, the integrity, safety, cycle life and bendability of the flexible cell could be improved.

To achieve the abovementioned objectives, the present invention provides a flexible package. The flexible package comprises a flexible body and a support module. The flexible body has at least a fixed part, a first inner surface and a second inner surface, and the fixed part is disposed on the flexible body and provides a binding force to the flexible body. The support module is disposed in the flexible body. The support module comprises a first structural member, a second structural member and at least two cushioning members. The first structural member is disposed adjacent to the first inner surface. The second structural member is disposed adjacent to the second inner surface and corresponding to the first structural member. The cushioning member interposed between the peripheral edge of the first structural member and the second structural member to resist the binding force and to support the first structural member and the second structural member. At least one flexible cell is disposed in a placing space formed by the first structural member, the second structural member and the cushioning members. Thus, the binding force to the flexible body could be absorbed by the design of the support module comprising the first structural member, the second structural member and the cushioning member. Therefore, the electrode layers inside the flexible cell can be protected. In such case, it is possible to reduce the possibility of defects such as peeling off or separation of the cell, and to improve the integrity, safety, cycle life and the bendability of the flexible cell.

Below, the embodiments are described in detail in cooperation with the drawings to make easily understood the technical contents, characteristics and accomplishments of the present invention.

DETAILED DESCRIPTION

Figure 1:
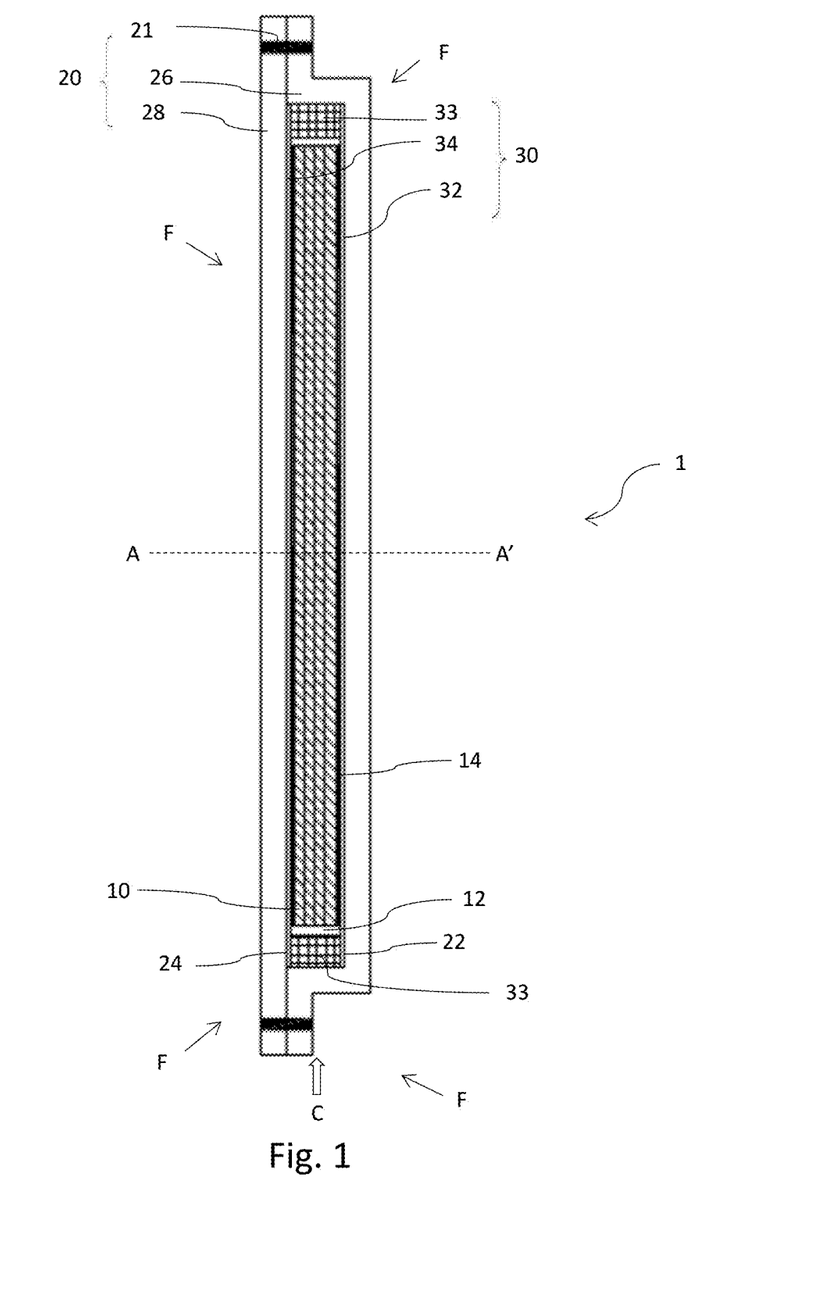
FIG. 1 is a schematic diagram of a cross-sectional view of the flexible package of the present invention.

Please see FIG. 1, the flexible package 1 for disposing at least one flexible cell 10. The flexible package 1 comprises a flexible body 20 and a support module 30.

The flexible body 20 includes at least a fixed part 21, a first inner surface 22 and a second inner surface 24. The fixed part 21 is disposed on the flexible body 20 to stable the structure of the flexible body 20. The fixed part 21 provides a binding force F to the flexible body 20, which can be directed to any direction inside the flexible body 20. The flexible body 20 may be integrated or divided. As shown in FIG. 1, the flexible body 20 includes an upper part 26 and a lower part 28 connected by the fixed part 21. The upper part 26 and the lower part 28 may be two independent structures or may be an integrated structure. The fixed part 21 may be a linear object (e.g., suture), striped articles (e.g., buckle, strap), fasteners or rivets (e.g., buttons, hook fasteners, rivets, and screws), colloid (e.g., sealant, silicone) or other suitable items for connection. The material of the flexible body 20 may be cloth, fiber, leather, metal, polymeric material or other suitable material having flexibility.

The support module 30 includes a first structural member 32, a second structural member 34, and at least two cushioning members 33. The first structural member 32 is disposed adjacent to the first inner surface 22 of the flexible body 20. The second structural member 34 is adjacent to the second inner surface 24 of the flexible body 20 and corresponding to the first structural member 32. The materials of the first structural member 32 and the second structural member 34 may be metallic materials (e.g., steel), ceramic materials, fibers, glass, polymeric materials (e.g., polymeric elastomers) or other suitable materials. For example, the first structural member 32 and the second structural member 34 may be similar to a hinge structure. The cushioning member 33 is interposed between the peripheral edge of the first structural member 32 and the second structural member 34. The binding force F from the flexible body 20 could be against by the structure and the positional arrangement of the cushioning member 33 so that the first structural member 32 and the second structural member 34 can be supported. At least one flexible cell can be disposed in a placing space formed by the first structural member 32, the second structural member 34, and the cushioning member 33, and the plurality of flexible cells 10 may be in parallel or in series. More specifically, the cushioning member 33 has a top part and a bottom part which are respectively connected to the first and second structural members 32, 34. For example, the top of the cushion member 33 is connected to the first structural member 32, and the bottom of the cushioning member 33 is connected to the second structural member 34. However, the descriptions above are not to limit the way of connection, for example, the way of connection could be welding, bonding, and splicing, fastening or other suitable ways. The material of the cushioning member may be a metal material, a ceramic material, a polymer material or other suitable material.

The flexible body 20 has an initial state and a curved state. The first structural member 32, the second structural member 34, the cushioning member 33, and the flexible cell 10 could be deformed to the curved state as the flexible body 20 bending. In order to reduce the frictional force at the surface of the flexible cell 10 during bending, in some embodiments, the friction factor of at least one of the first structural member 32 and the second structural member 34 of the support module 30 is less than the friction factor of the flexible body 20. Further, a sliding layer 14 may be disposed on the surface of the flexible cell 10 to increase the sliding property between the layers. Absolutely, the sliding layer 14 may be interposed between the flexible body 20 and the support module 30 to further enhance the sliding property. The material of the sliding layer 14 may be selected from polymers (e.g., polytetrafluoroethylene) or other materials having a low friction coefficient and suitable for reducing the friction force.

Figure 2:
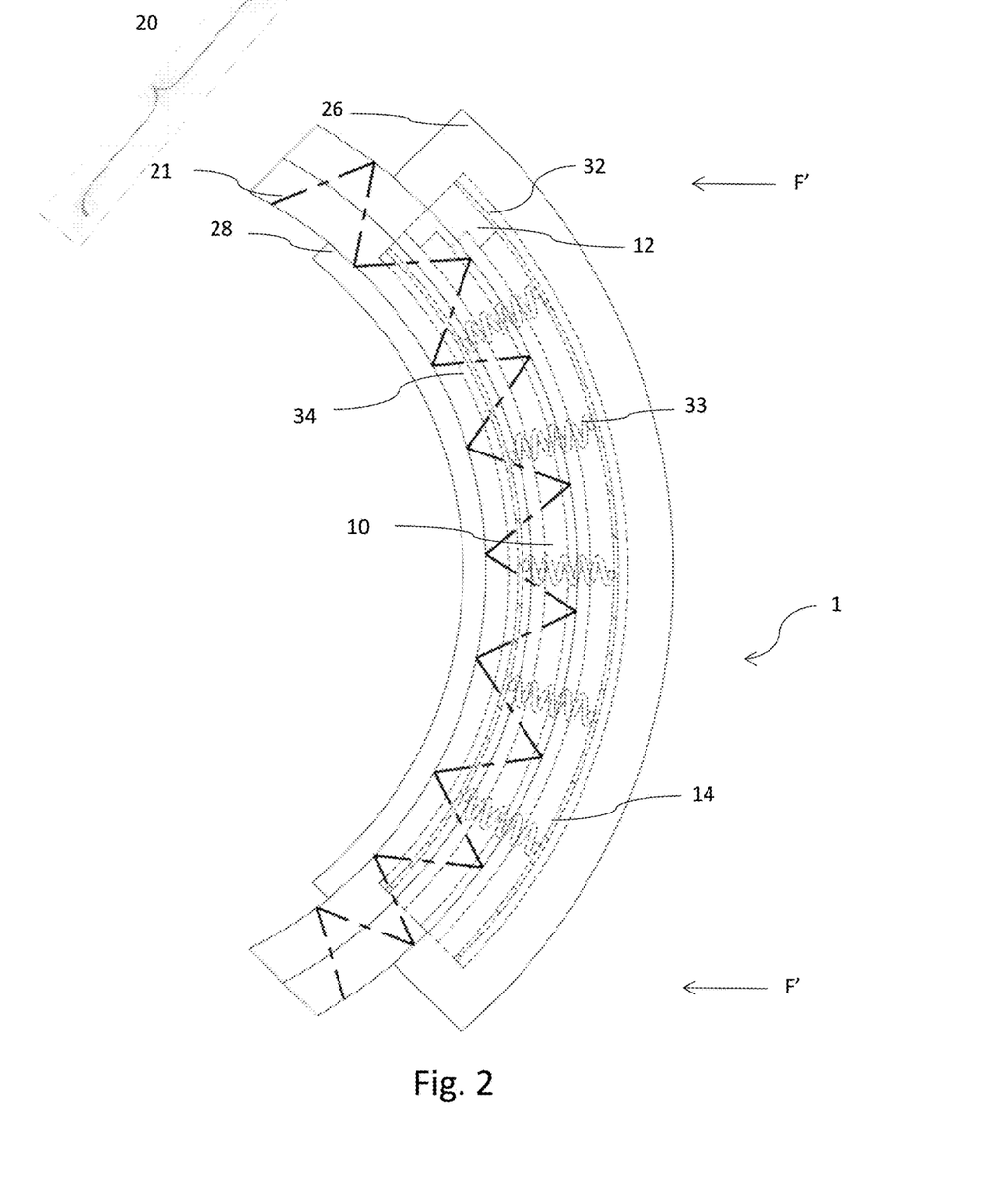
FIG. 2 is a schematic diagram illustrating the flexible package of the present invention.

Referring to FIGS. 1 and 2; the first structural member 32, the second structural member 34, and the cushioning member 33 against the binding force F of the flexible body 20 and form the placing space 12. The cushioning member 33 interposed between the peripheral edge of the first structural member 32 and the second structural member 34 should not completely limit the bending of the first structural member 32 and the second structure member 34. When a flexure force F' is applied to the flexible body 20, the flexible body 20 transitions from an initial state to a curved state, and the first structural member 32, the second structural member 34, the cushioning member 33 and the flexible cell 10 could be deformed to the curved state as the flexible body 20 bending. The deformation of the cushioning member 33 may include stretching deformation or bending deformation and provides a maximum amount of deformation during bending. In addition to forming the placing space 12, the first structural member 32, the second structural member 34, and the cushioning member 33 prevent the flexible cell 10 out of the risks of puncture and excessive bending. In more detail, the stress generated during bending from the initial state to the curved state or from the curved state to the initial state can be divided into a vertical force and a lateral force to the surface of the flexible cell 10. The vertical force and the lateral force may create frictional force between the surfaces of the flexible cell 10 and increase the probability of damage of the flexible cell 10. Further, the frictional force on the surface of the flexible battery cell 10 may cause the difficulty of bending, and the damage of surface. Therefore, the force acting on the flexible battery cell 10 and the stress generated between the layers inside the flexible cell 10 or between the layers and the flexible battery cell 10 are carried and shared by the deformation of the first structural member 32, the second structural member 34 and the cushioning member 33. This makes it possible to reduce the defects such as peeling of, separation of the flexible battery cell 10, and improving the integrity, safety, cycle life and the bendability of the flexible battery cell 10.

Figure 3A:
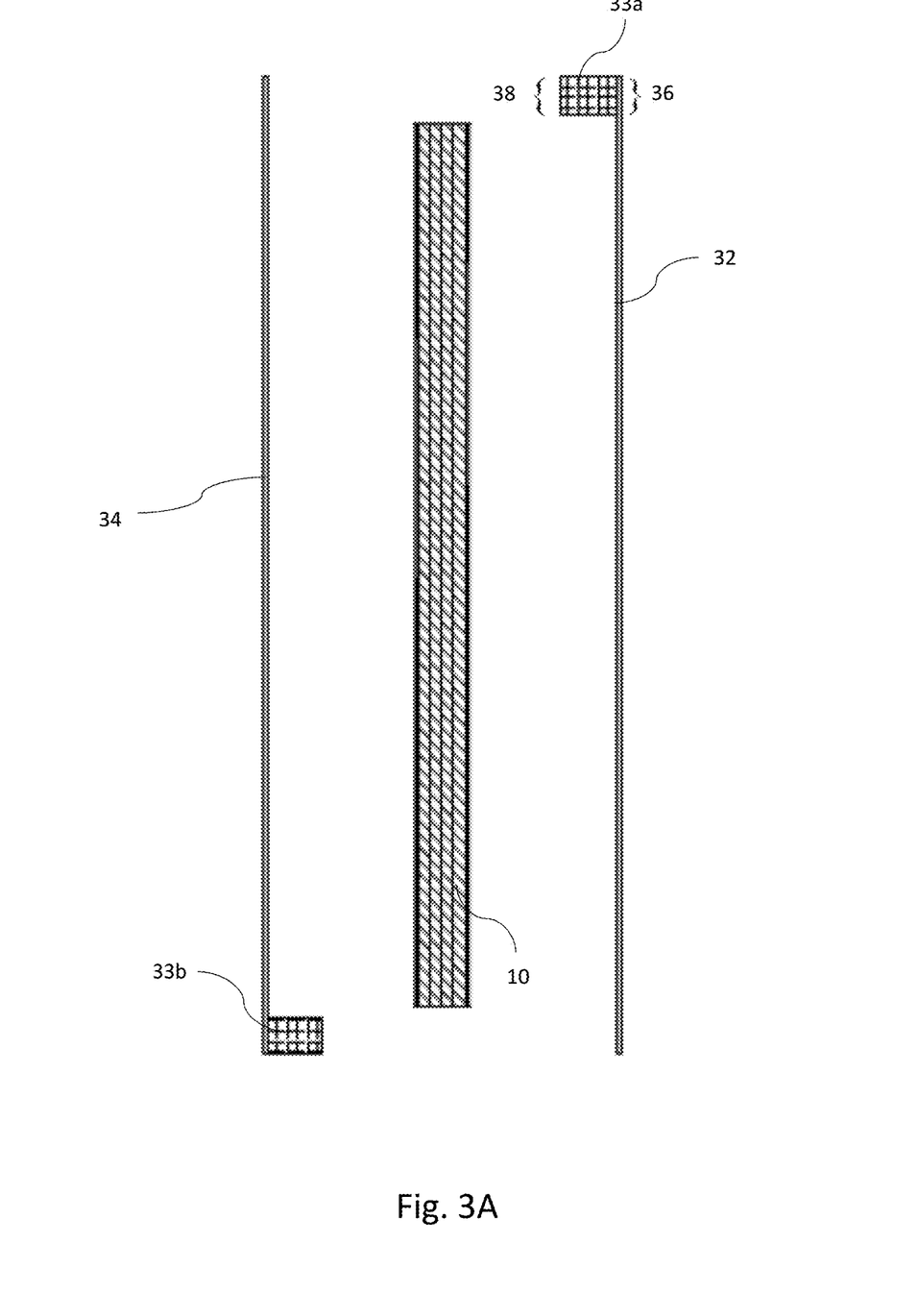
FIG. 3A-3B are schematic diagrams illustrating the arrangement of the cushioning member of the flexible package of the present invention.
Figure 3B:
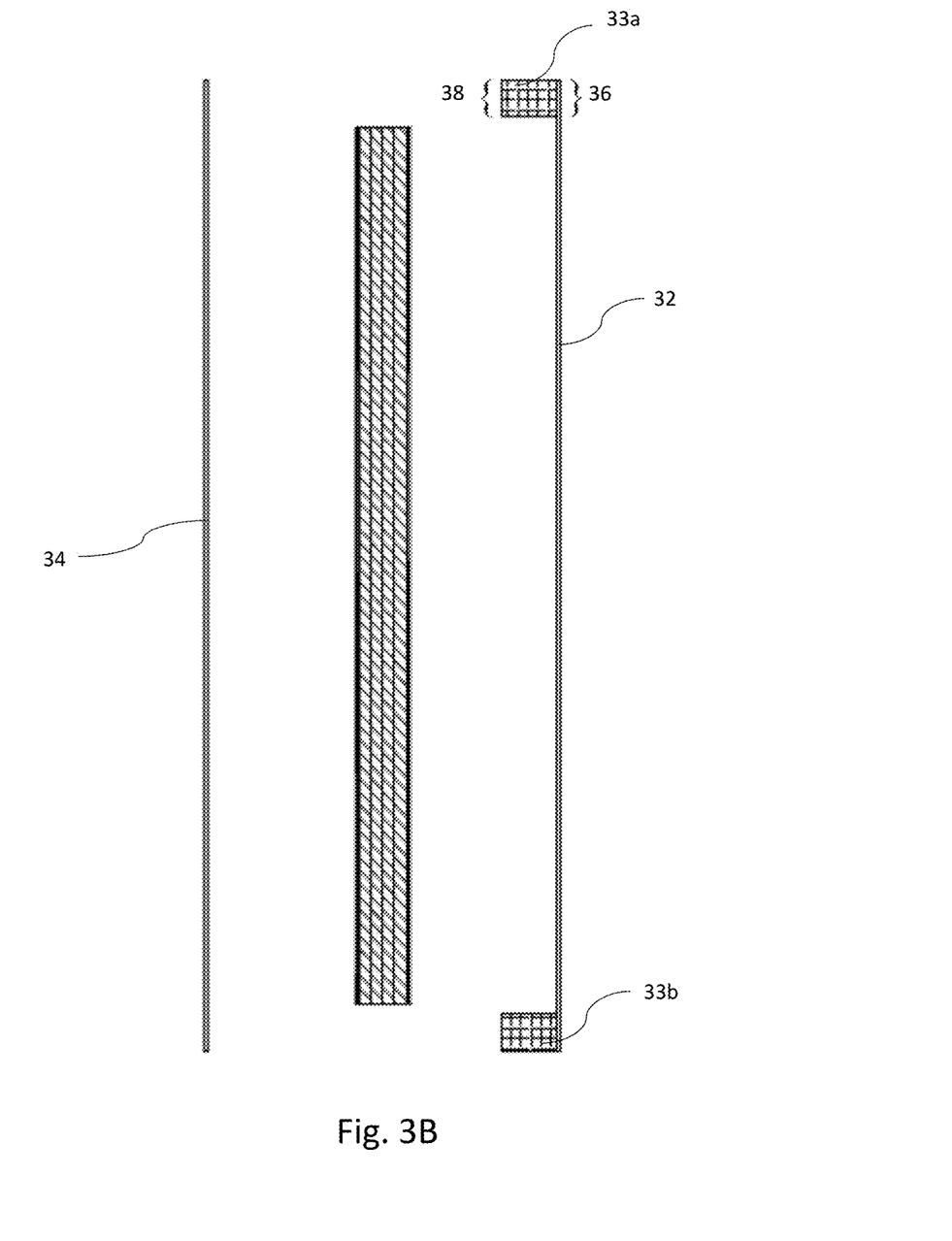

Please refer to FIG. 3A; the cushioning member 33a is connected to at least one of the first structural member 32 and the second structural member 34. The top part 36 of the cushioning member 33a is connected to the first structural member 32, and the bottom portion 38 adjacent to the second structural member 34 is a free end. At the time of bending, the bottom 38 of the cushioning member 34 slides relative to the structural member (second structural member 34). That is, during the transition of the flexible body 20 from the initial state to the curved state, the second structural member 34 will be deformed. So that the free ends of the second structural member 34 and the cushioning member 33a slide relatively. On the other hand, as shown in FIG. 3B, the cushioning members 33a are disposed at intervals, so that the interference of the cushioning members 33a can be reduced during the transition of the initial state to the curved state.

Figure 4A:
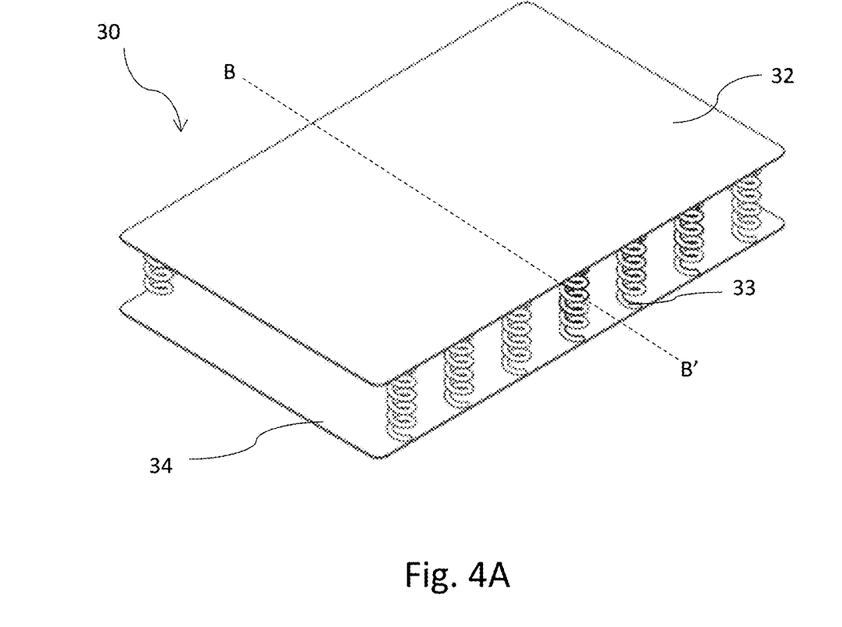
FIG. 4A-4B are schematic diagrams illustrating the cushion member according to the embodiment of the present invention.
Figure 4B:
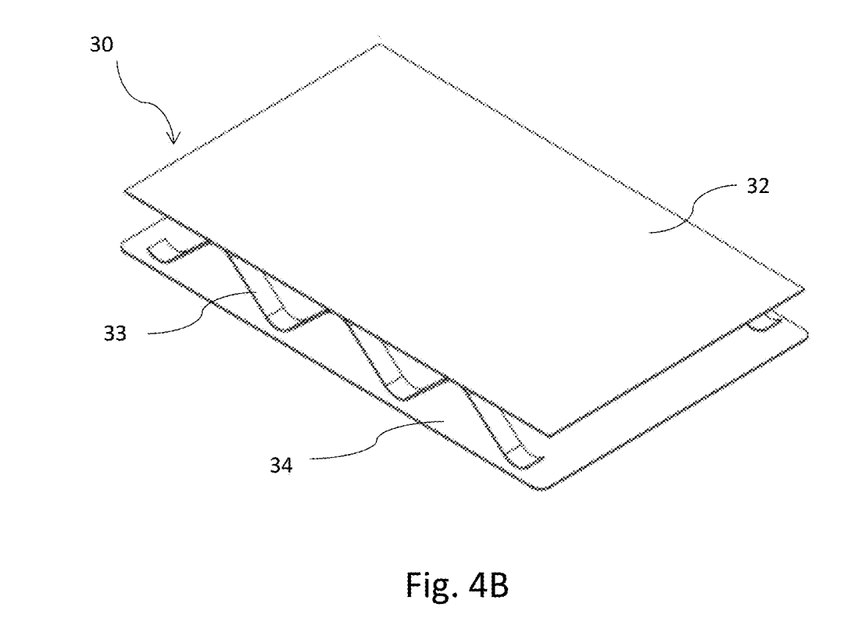

The structure of the cushioning member 33 may be a compressible body, an incompressible body or a combination thereof. The type of the cushioning member 33 may be selected from springs, shrapnel, elastomers or other suitable elements made of polymeric materials, metallic materials, ceramic materials, fibrous materials and the like. Please refer to FIG. 4A and FIG. 4B, these are the embodiments of the cushioning member 33 of the present invention. In FIG. 4A, the cushioning member 33 is a coil spring, and in FIG. 4B, the cushioning member 33 is a wave spring. Please refer to FIG. 1 and FIG. 4A, the first structural member 42 and the second structural member 44 are supported by the cushioning member 33 to resist the binding force F of the flexible body 20. The support module 40 carries and disperses the extrusion from the flexible body 20 when the flexible body 20 transitions from the initial state to the curved state or from the curved state to the initial state. In FIG. 4A and FIG. 4B, the cushioning member 33 may have a telescopic deformation in the vertical direction and have a maximum compression. So that the stress acting on the flexible cell 10 and the stress generated between the electrode layers inside the flexible cell 10 or the flexible battery cells 10 are absorbed by the telescopic deformation of the cushioning member 33. In this way, it is possible to reduce the possibility of defects such as peeling off, separation of the battery cell 10, and to improve the integrity, safety, cycle life and the bendability of the battery cell 10.

Figure 5A:
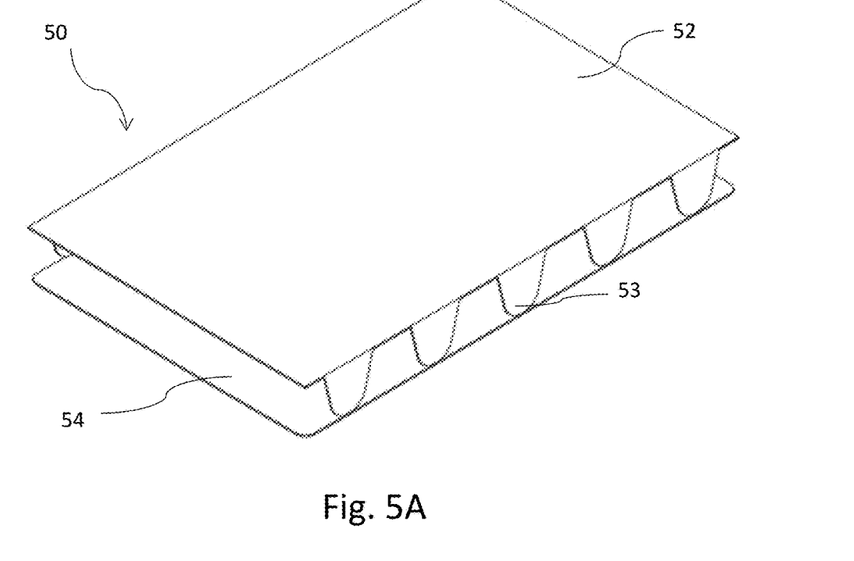
FIG. 5A-5C are schematic diagrams illustrating the cushion member according to another embodiment of the present invention.
Figure 5B:
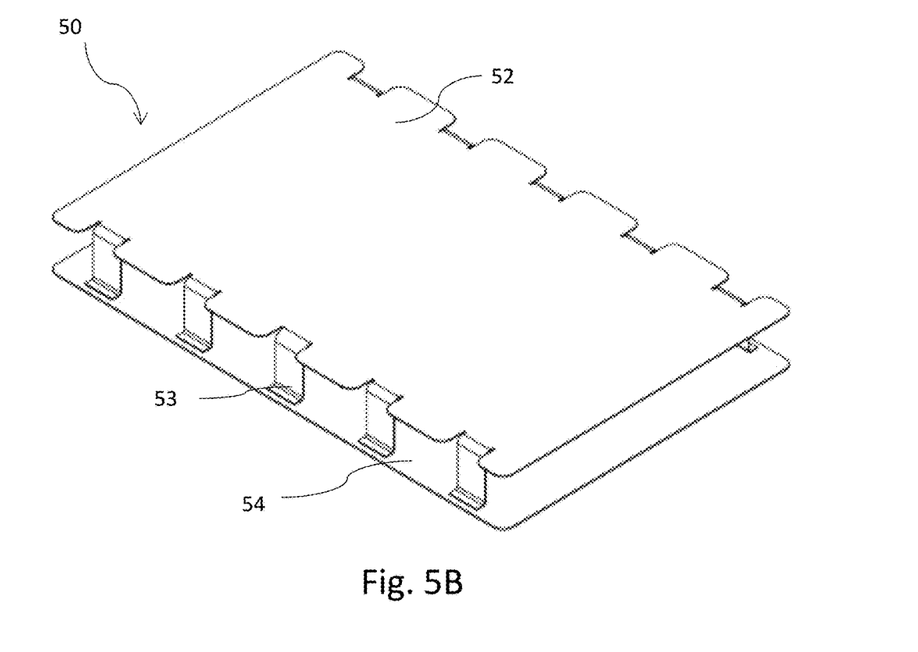
Figure 5C:
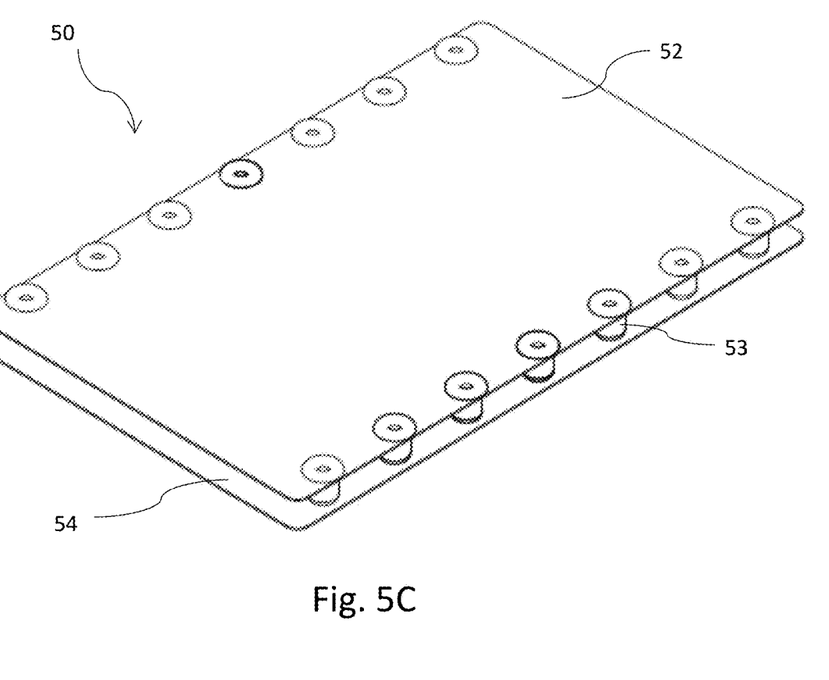

Please refer to FIG. 5A, FIGS. 5B and 5C. In FIG. 5A, the cushioning member 33 is in the form of a sheet. In FIG. 5B, the cushioning member 33 is in the form of a plate. In FIG. 5C, the cushioning member 33 is presented in a columnar shape. The type of the cushioning member 33 may be varied from plate, sheet, column, or other suitable form.

The support module 50 disclosed herein comprises a first structural member 52, a second structural member 54 and a cushioning member 53, which can be used to stand for the binding force and extrusion from the flexible body 20. The cushioning member 53 further has a horizontal bending deformation and has a maximum bend range. Therefore, during the transition from the initial state to the bending state, the bending deformation of the cushioning member 53 carries and shares the stress acting between the flexible battery cell 10 and the stress generated between the inner electrode layers of the flexible cell 10 or the flexible battery cells 10 during bending. In this way, it is possible to reduce defects such as peeling off, separation of the battery cell 10, and to improve the integrity, safety, cycle life and the bendability of the battery cell 10. Certainly, the compressible cushioning member 33 and the incompressible cushioning member 53 can be used in the same embodiments. In other words, some of the cushioning members 33 are compressible and the others are incompressible.

In addition, the cushioning member disclosed in the present invention may be disposed on either, three, or four sides of the peripheral edge between the first structural member and the second structural member. For example, the cushioning member may be disposed on opposite sides and may be disposed correspondingly to each other or not correspondingly. When the number of cushioning members is three, the three cushioning members may be disposed on the same side, or the two cushioning members are located on the same side, the other cushioning member may be on the other side or the three cushioning members may be on different sides. In addition, these cushioning members may be arranged symmetrically or asymmetrically, and the above symmetry may refer to the symmetry of the number, or the symmetry of the position, depending on the demand and the design. The amount of the cushioning member or the distance between these cushioning members may be determined by the strength of binding force generated by the flexible body to the support module, or the material properties of the support module, or the size of the flexible body. For example, in order to maintain the same size of placing space, the bigger strength of the binding force is, the more number of the cushioning member is, and the less distance between the cushioning members.

The embodiments described above are merely give the detailed technical contents of the present invention but not to limit the covered range of the present invention. Therefore, any equivalent modification or variation according to the shapes, structures, features, or spirit disclosed in the present invention is also covered in the following claims as appended.

What is claimed is:

1. A flexible package that accommodates at least one flexible battery cell and that permits bending of the at least one flexible battery cell accommodated therein, the flexible package comprising:
    a flexible body that comprises an upper part including a first inner surface and having a periphery; a lower part correspondingly disposed with the upper part and including a second inner surface and a periphery; and at least one fixing part that is disposed around the periphery of the upper part and the periphery of the lower part to fixedly connect the upper part and the lower part and provide a binding force to the flexible body; and
    a support module that is disposed within and accommodated by the flexible body and that comprises:
        a first structural member disposed adjacent to the first inner surface and extending along at least a portion thereof;
        a second structural member disposed adjacent to the second inner surface and extending along at least a portion thereof, and correspondingly disposed with the first structural member; and
        at least two cushioning members interposed between and in direct connection with both the first structural member and the second structural member at least between respective peripheral edges thereof to resist the binding force provided to the flexible body by the at least one fixing part and to support the first structural member and the second structural member,
    wherein the first structural member, the second structural member and the at least two cushioning members define a space therebetween that accommodates said at least one flexible battery cell and that permits bending of the at least one flexible battery cell accommodated therein from an initial state into a curved state.

2. The flexible package of claim 1, wherein at least one of the first structural member and the second structural member has a friction factor that is smaller than that of the flexible body.

3. The flexible package of claim 1, further comprising a sliding layer disposed adjacent to the first structural member or second structural member of the support module.

4. The flexible package of claim 1, wherein the at least two cushioning members are disposed at intervals.

5. The flexible package of claim 1, wherein each cushioning member of the at least two cushioning members is directly connected to both the first structural member and the second structural member.

6. The flexible package of claim 1, wherein the at least two cushioning members have a structure that is a body which is at least partially compressible.

7. The flexible package of claim 1, wherein the at least two cushioning members are made of a material that is selected from the group consisting of a metal material, a ceramic material, a fiber, a polymer material and a combination thereof.

8. The flexible package of claim 1, wherein the first structural member and the second structural member are made of a material that is selected from the group consisting of a metal material, a ceramic material, a fiber, a glass, a polymer material and a combination thereof.

9. The flexible package of claim 1, wherein the flexible body is made of a material that is selected from the group consisting of cloth, fiber, leather, metal, polymer material and a combination thereof.

10. The flexible package of claim 1, wherein the fixing part is selected from the group consisting of a linear object, a striped article, a fastener or a rivet, a colloid and a combination thereof.

* * * * *